(12) United States Patent
Verger et al.

(10) Patent No.: US 7,661,728 B2
(45) Date of Patent: Feb. 16, 2010

(54) THREADED TUBULAR CONNECTION WITH PROGRESSIVE AXIAL THREAD INTERFERENCE

(75) Inventors: Eric Verger, Gommegnies (FR); Damien De Montlebert, Paris (FR); Emeric Thoreau, Villeneuve d'Ascq (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 373 days.

(21) Appl. No.: 10/558,410

(22) PCT Filed: May 13, 2004

(86) PCT No.: PCT/EP2004/005139

§ 371 (c)(1),
(2), (4) Date: Nov. 28, 2005

(87) PCT Pub. No.: WO2004/106797

PCT Pub. Date: Dec. 9, 2004

(65) Prior Publication Data

US 2006/0261595 A1 Nov. 23, 2006

(30) Foreign Application Priority Data

May 30, 2003 (FR) .................................. 03 06599

(51) Int. Cl.
*F16L 25/00* (2006.01)
(52) U.S. Cl. ..................... 285/334; 285/355; 285/333

(58) Field of Classification Search .............. 285/13, 285/333–334, 355, 390
See application file for complete search history.

(56) References Cited

U.S. PATENT DOCUMENTS

| 1,927,656 | A | * | 9/1933 | Eaton et al. ................. 285/115 |
| 2,992,019 | A | | 7/1961 | MacArthur |
| 3,870,351 | A | * | 3/1975 | Matsuki ..................... 285/334 |
| 3,989,284 | A | * | 11/1976 | Blose ....................... 285/332.2 |
| 4,153,283 | A | | 5/1979 | Hellmund et al. |
| RE30,647 | E | | 6/1981 | Blose |
| 4,611,838 | A | * | 9/1986 | Heilmann et al. ........... 285/331 |
| 4,730,857 | A | * | 3/1988 | Schwind ..................... 285/390 |
| 4,736,967 | A | * | 4/1988 | Mott et al. ................... 285/94 |
| 4,770,444 | A | * | 9/1988 | Hauk ......................... 285/55 |
| RE34,467 | E | | 12/1993 | Reeves |
| 6,481,760 | B1 | | 11/2002 | Noel et al. |
| 6,905,149 | B2 | * | 6/2005 | DeLange et al. ............ 285/334 |
| 2002/0027363 | A1 | * | 3/2002 | Mallis et al. ................ 285/334 |

FOREIGN PATENT DOCUMENTS

EP 1 302 623 4/2003
WO 2004/060590 7/2004

* cited by examiner

*Primary Examiner*—Aaron M Dunwoody
*Assistant Examiner*—Fannie Kee
(74) *Attorney, Agent, or Firm*—Oblon, Spivak, McClelland, Maier & Neustadt, L.L.P.

(57) ABSTRACT

A threaded connection includes at least one contact zone axially separated from threadings in which male and female elements are in sealed contact via bearing surfaces respectively constituted by a cambered surface and by a tapered surface.

35 Claims, 5 Drawing Sheets

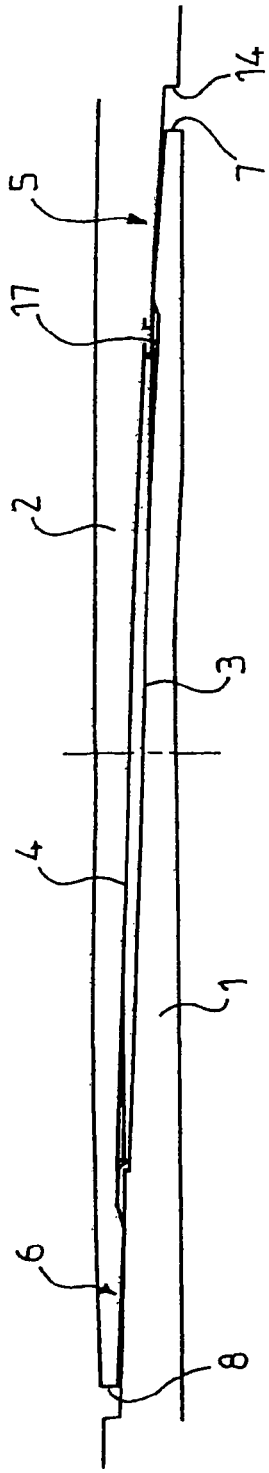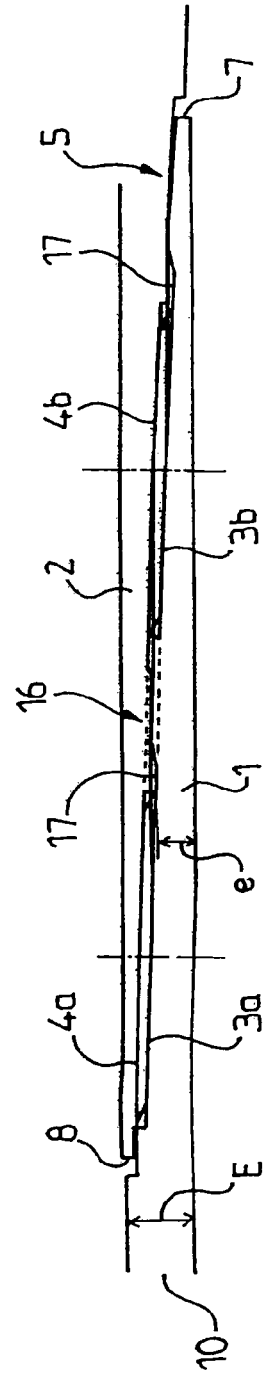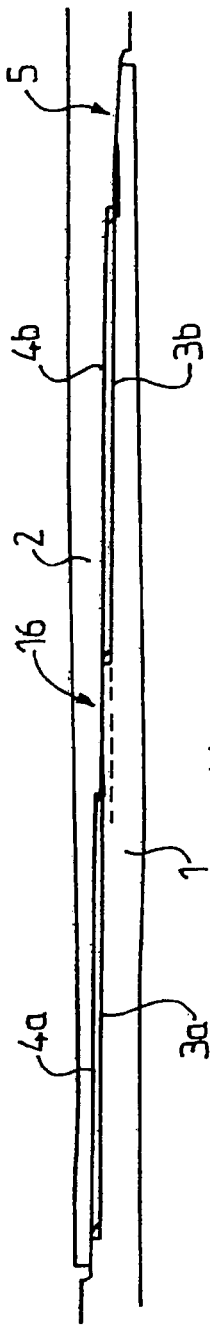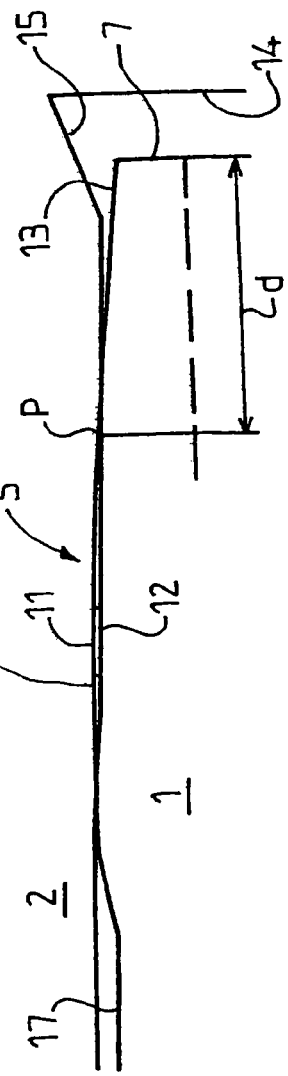

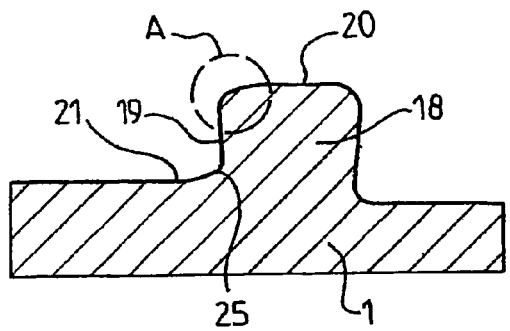
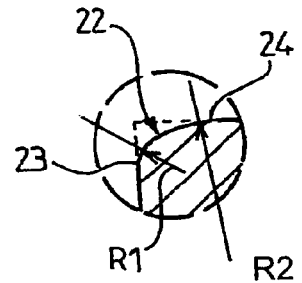
FIG. 5　　　　　FIG. 5A
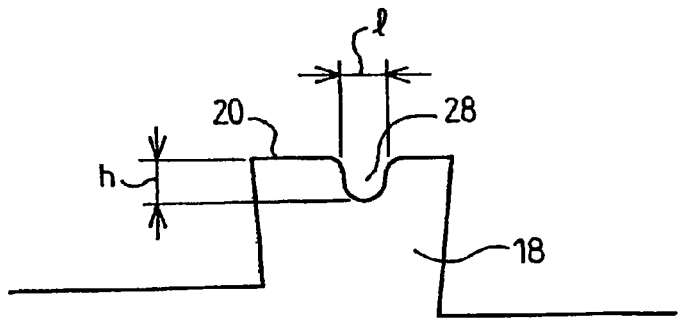
FIG. 6
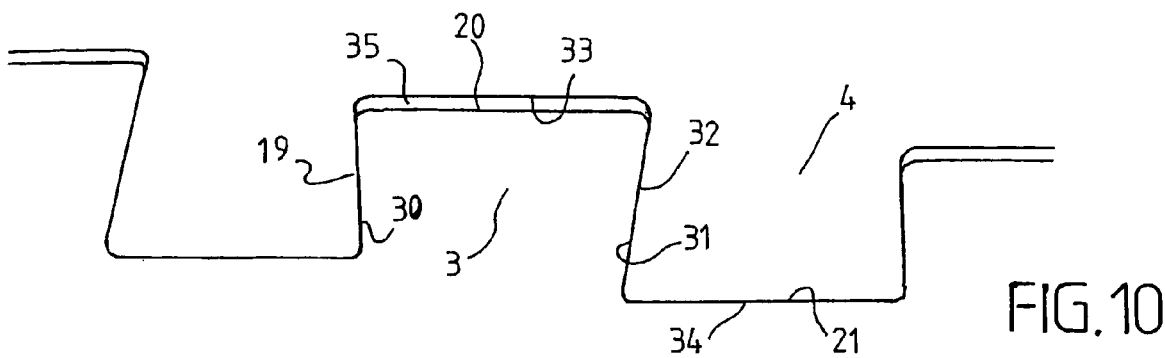
FIG. 10

THREADED TUBULAR CONNECTION WITH PROGRESSIVE AXIAL THREAD INTERFERENCE

BACKGROUND OF THE INVENTION

1. Field of the Invention

The invention relates to a threaded tubular connection comprising a male tubular element comprising a male threading and a female tubular element comprising a female threading which cooperates by makeup with said male threading, the axial width of the threads of said threadings and/or the intervals between said threads varying progressively along the axis of the connection over at least a portion of the axial length of the threadings, such that the threads of each threading are housed with an axial clearance in the intervals of the other threading at the start of makeup, said clearance progressively decreasing until it becomes zero during makeup.

2. Discussion of the Background

The term "sealed contact" as used here means contact between two surfaces pressed hard against each other to produce a metal-to-metal seal, in particular a gas-tight seal.

Threaded connections of this type are well known, in particular for use in oil and gas wells. They generally have threads with a dovetail profile as described, for example, in U.S. Re 30 647 and U.S. Re 34 467. They suffer from a number of drawbacks. Firstly, the geometrical characteristics of progressive interfering threads cannot ensure a gas-tight seal. Such a seal is difficult to obtain with abutment surfaces separate from the threadings; sealing surfaces demand very accurate relative positioning of the two elements at the end of makeup. However, the final relative position of the elements is in this case strongly influenced by the machining tolerances for the threads. The use of tapered sealing surfaces with a small taper and thus a small vertex angle, which are more tolerant as regards axial position, does not constitute a satisfactory solution as such bearing surfaces are extremely sensitive to the phenomenon of galling, which result in spoiling after only a few makeup-breakout operations.

A further disadvantage of said known threaded connections is that the geometric characteristics of the threadings do not encourage evacuation of the lubrication grease used for makeup. This grease can accumulate locally, for example between the thread crests and roots, giving rise to very high pressures which in their turn perturb proper positioning of the elements and contact of the sealing surfaces.

SUMMARY OF THE INVENTION

The invention aims to eliminate all of the drawbacks mentioned above and to maximize the axial effective contact length under load (internal or external pressure, axial tension or compression) of the sealing surfaces.

The invention also aims to provide a threaded connection that resists cyclic mechanical loads (fatigue).

To this end, the invention provides a threaded connection of the type defined in the introduction, comprising at least one contact zone axially separated from said threadings, in which the male and female elements are in sealed contact by means of bearing surfaces respectively constituted by a cambered surface and by a tapered surface.

It has been shown that such a contact zone, which is known per se, allows a substantial variation in the axial position of the contact zone and thus in the relative position of the elements without losing the gas-tight seal, the effective length of the contact zone or the integral of the contact pressure along the contact zone being high (contact stability).

Optional characteristics of the invention, which may be complementary or substitutional, are defined below:

The cambered surface has a generatrix with a radius of curvature in the range 30 to 80 mm.

The tangent to the vertex half angle of the tapered surface is in the range 0.025 to 0.075, corresponding to a taper in the range 5% to 15%.

The contact zone is axially located between the threadings and the free end of the male element.

The contact zone is axially located between the threadings and the free end of the female element.

The contact zone is axially spaced from said free end by at least 3 mm.

The cambered surface and the tapered surface are provided on the element having said free end and on the other element respectively.

The cambered surface extends in the direction of said free end with a second tapered surface which is tangential to the cambered surface.

The contact zone is axially located between two portions of each of said threadings.

The cambered surface and the tapered surface are formed on the male and female elements respectively.

The male and female elements are free of axial abutment surfaces.

The axial width of the threads of said threadings and/or the intervals between said threads varies progressively over the whole of the axial length of said threadings.

The axial width of the threads of said threadings and/or the intervals between said threads varies progressively over the whole of the axial length of each of said threading portions.

Said threadings are tapered.

The tapered surfaces having lines joining homologous points on the different turns as generatrices for the two portions of the same threading respectively are substantially coincident.

The tapered surfaces having lines joining homologous points of the different turns as generatrices respectively for the two portions of the same threading are distinct.

Said tapered surfaces are radially distant by at least one thread depth.

Said threads have a dovetail profile.

The crests and roots of said threads are parallel to the axis of the threaded connection.

The male element is on a great length pipe and its minimum radial thickness e between the portion of its threading that is furthest from its free end and said contact zone is at least 60% of the radial thickness E within the length of the pipe.

The connection comprises two contact zones situated respectively in two of the axial positions as described above.

A groove formed at the crest of the male or the female threads extends along the helical path thereof to allow evacuation of a lubricant and terminates in an annular discharge space present between the male and female elements at the end of the threading or the threading portion concerned, to release the grease pressure.

Said groove has a width of about 0.4 mm.

Said groove has a depth of about 0.4 mm.

For the male threading and/or the female threading, the loading flank joins the crest and/or the root of the thread via a rounded portion the profile of which is substantially formed by two arcs of circles tangential to each other, the arc adjacent to the loading flank having a smaller radius of curvature than the other arc.

The radius of the arc adjacent to the loading flank is in the range 0.1 to 0.2 mm.

The radius of said other arc is in the range 0.8 to 1.2 mm.

The male and female threadings are non interfering at the thread roots and crests over all or a portion of the threadings.

The male and female threadings are interfering at the thread roots and crests over all or a portion of threadings.

The male and female threadings are interfering at the thread roots of a first threading and at the thread crests of a second threading over all or a portion of the threading length whereas there is a radial clearance between the thread roots of the second threading and the thread crests of the first threading.

Said radial clearance is at least 0.05 mm

BRIEF DESCRIPTION OF THE DRAWINGS

The characteristics and advantages of the invention will now be described in more detail in the description below, made with reference to the accompanying drawings.

FIGS. 1 to 3 are half axial cross sectional views of three threaded tubular connections of the invention intended for oil or gas wells.

FIG. 4 is a partial view on a larger scale of a region of any one of the connections of FIGS. 1 to 3 close to the free end of the male element.

FIGS. 5 and 6 are partial axial cross sectional views, on a still larger scale, each showing one thread of a connection of the invention.

FIG. 5A shows detail A of FIG. 5 on a larger scale.

FIG. 10 shows a variation of FIGS. 7 and 8.

DETAILED DESCRIPTION OF THE PREFERRED EMBODIMENTS

Figure 7:
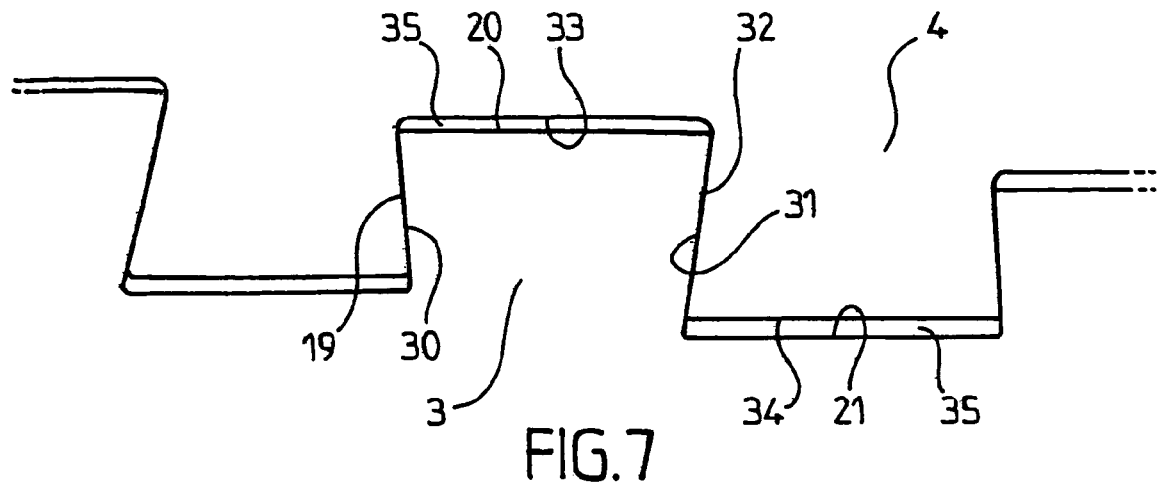
FIGS. 7 and 8 show partial axial sectional views each showing a few turns of the male and female threadings of a connection of the invention in the made up position for non interfering and interfering threadings respectively.

The threaded tubular connection shown in FIG. 1 comprises a male tubular element 1 and a female tubular element 2 each on a great length pipe, not shown in its entirety, and provided with respective tapered threadings 3, 4 which cooperate together for mutual assembly by makeup of the two elements. The threadings 3, 4 are of a known type with a progressive variation in the axial thread width and/or the intervals between threads so that a progressive axial interference occurs during makeup until a final blocked position.

In accordance with the invention, the fluid seal, both against the interior of the tubular connection and against exterior media, is ensured by two contact zones 5, 6 axially located either side of the threadings 3, 4 respectively close to the free end 7 of the male element and the free end 8 of the female element.

The contact zone 5 is shown on a larger scale in FIG. 4. To define said contact zone, male element 1 has a cambered surface 11 turned radially outwardly, the diameter of which decreases towards the free end 7. The surface 11 has an arc of a circle as a generatrix, with a radius in the range 40 to 80 mm. Facing said cambered surface 11, the female element 2 has a tapered surface 12 turned radially towards the interior and with a diameter that decreases in the direction of the free end 7 of the male element, i.e. opposite the free end 8 of the female element. The tangent to the vertex half angle of the tapered surface 12 is in the range 0.025 to 0.075, i.e. a taper that is in the range 5% to 15%. For illustrative purposes, the surfaces 11 and 12 are shown in FIG. 4 in their initial geometric form before makeup but in a relative position corresponding to the end of makeup of the threaded connection, so that their generatrices intersect one another. Clearly, in reality, progressive deformation of said surfaces occurs during makeup, leading to a seal by radial interference. The contact zone proper or effective contact zone between surfaces 11 and 12 has a certain length and terminates at a point P which is spaced from the free end 7 by a distance d, advantageously at least 3 mm.

The inventors have discovered that such a contact zone between a tapered surface and a cambered surface produces a high effective axial contact width and a substantially parabolic distribution of contact pressures along the effective contact zone, in contrast to contact zones between two tapered surfaces which have two narrow effective contact zones at the ends of the contact zone.

A contact zone geometry of the invention preserves a good effective contact width despite axial positional variations of the assembled elements due to machining tolerances, the effective contact zone pivoting along the cambered section of the cambered surface 11, retaining a parabolic profile for the local contact pressure.

In this regard, it is an advantage that the axial length of the contact surfaces 11, 12 be greater than the axial positioning variations of the effective contact zone. Preferably the axial length of the contact surfaces 11, 12 is greater or equal to 3.5 mm.

This is also the case under service conditions when the stresses to which the threaded elements of the connection are subjected (in particular internal or external pressure) induce pivoting of the contact surfaces 11, 12.

The contact zone geometry of the invention appeared particularly advantageous for ensuring the seal when the connection is subjected to a high internal pressure after being subjected to a high external pressure.

Too small a taper (<5%) for the surface 12 induces a risk of galling on makeup and too high a taper (>15%) necessitates machining tolerances that are too narrow.

Too large a radius (>80 mm) for the cambered surface 11 induces disadvantages that are identical to those with a taper-to-taper contact.

Too low a radius (<30 mm) for said cambered surface 11 induces an insufficient contact width.

A distance of at least 3 mm of point P from the free end 7 increases the radial stiffness of the male lip on which the cambered surface 11 is formed and can then increase the contact pressures for a given section of material at point P.

The distance d is preferably in the range 4 to 10 mm and in particular, varies with the pipe diameter.

In the example illustrated, the cambered surface includes a curved contact surface 44 which is curved along an axial direction as shown in FIG. 4. The cambered surface 11 of the male element extends beyond point P and the curved contact surface 44 connects tangentially with a tapered surface 13 with a vertex half angle of seven degrees which extends to the free end 7 of said element, which is a flat surface perpendicular to the axis of the threaded connection. The tapered surface 12 extends beyond point P and is followed by a backoff hollow 15 up to a shoulder 14 of the female element facing end 7 and having a flat annular form perpendicular to the axis of the threaded connection.

The make up of the elements is not limited by any axial abutment surface. In particular surfaces 7 and 14 do not come into abutment and do not play any role in the cooperation of elements 1 and 2. The backoff hollow between the tapered surface 12 and the shoulder 14 also plays no role in the cooperation of elements 1 and 2.

In contrast, the tapered surface between the cambered surface 11 and end 7 can pre-centre the male element as it engages with the female element prior to makeup without risking damage to the contact surfaces 11 and 12.

Further, it can keep a sufficient thickness of material at the end 7 for a given distance between it and the point P with respect to a male element wherein the cambered surface 11 would extend to the free end.

At the other end of the cambered surface 11 is an annular groove 17 which allows the male threading 3 to start.

Preferably, the thickness of the metal on the male element 1 at the bottom of said groove is at least 30% of the thickness of the pipe, to prevent radial deflection towards the axis of said zone.

Figure 12:
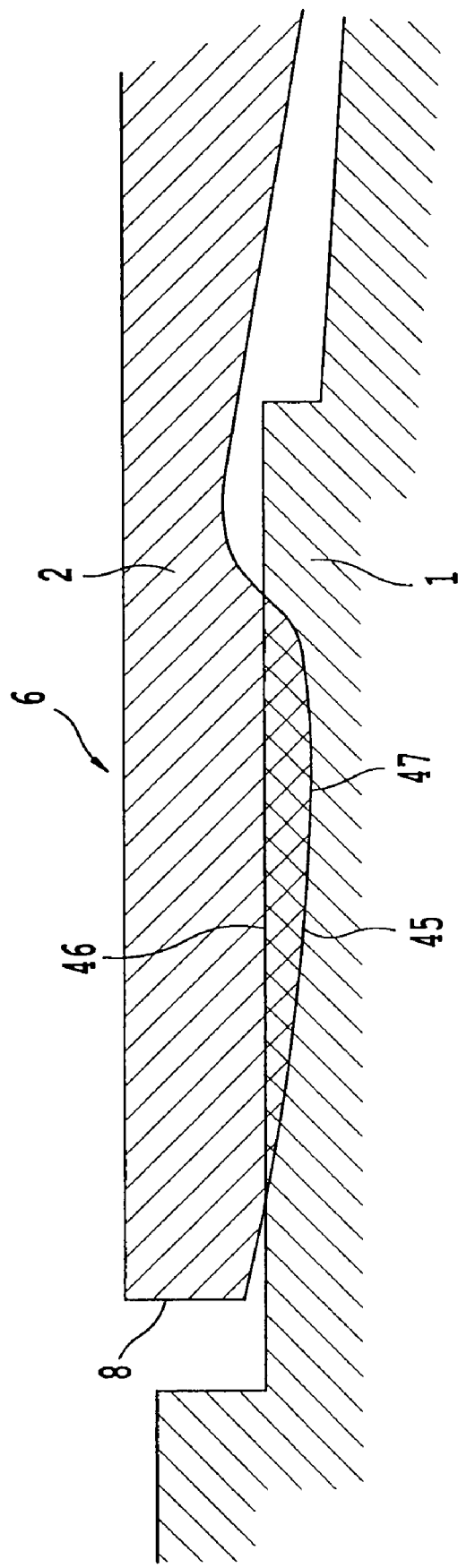
FIG. 12 is a partial view on a larger scale of contact zone 6 of FIG. 1 that is formed by a cambered surface and a tapered surface on the female element and the male element respectively.

The contact zone 6 is formed by a cambered surface 45 and a tapered surface 46 with the same geometric characteristics as the surfaces 11 and 12 of the zone 5, this time provided on the female element 2 and on the male element 1 respectively. The cambered surface 45 includes a curved contact surface 47 which is curved along an axial direction. An embodiment of the contact zone 6 is illustrated in FIG. 12 consistent with FIG. 1. The effective contact zone is spaced from the free end 8 of the female element by a distance of at least 3 mm. The inventors have established that such a distance can substantially increase the contact pressure in zones 5 and 6. The contact zone 5 provides the fluid-tight seal against the interior of the tubular connection and the contact zone 6 provides the fluid-tight seal against external media.

In contrast to threadings 3 and 4 of FIG. 1, which are continuous, each of the threadings of the tubular connection of FIG. 2 is separated into two portions separated from each other in the axial direction, namely into a male threading portion 3a cooperating with a portion of the female threading 4a, and a male threading portion 3b cooperating with a portion of the female threading 4b, portions 3a and 4a being closer to the free end 8 of the female element and portions 3b and 4b being closer to the free end 7 of the male element 1. The characteristic points of the thread profile, for example the roots of stabbing flanks of the threading portions 3a and 3b, are located on substantially coincident tapered surfaces and similarly for the threading portions 4a and 4b. The term "substantially coincident" means that said tapered surfaces are separated by a radial distance that does not exceed a few tenths of millimeters. The progressive variation in the axial width of the threads and/or the intervals between the threads occurs here for each of the threading portions, advantageously over the entire length of each thereof.

The seal of the connection of FIG. 2 towards the interior is ensured by a contact zone 5 that is identical to that of FIG. 1. For the seal towards the exterior, the contact zone 6 of FIG. 1 is replaced by an intermediate contact zone 16 located between the threading portions 3a and 4a and the threading portions 3b and 4b. The contact zone 16 is defined by a cambered surface on the male element and a tapered surface on the female element with the geometrical characteristics as described above for the contact zone 5 in FIG. 1.

For dovetail threads (see below), the minimum radial thickness e of the male element 1 between its threading portion 3a and the contact zone 16 is at least 60% of the radial thickness E in the length of the great length pipe 10 of which it forms part. The inventors have established that the geometry of dovetail threads increases the radial stiffness of their connection compared with threads that are commonly termed "trapezoidal", in which the axial width reduces from the thread root to the crest.

The tubular connection of FIG. 3 differs from that of FIG. 2 by a radial offset between the threads of the threading portions 3a and 4a and those of the threading portions 3b and 4b; the roots and crests of the loading flanks and the stabbing flanks of the threading threads 3a and 4b are located on tapered surfaces with a larger diameter than those of threading portions 3b and 4b. Said radial offset is greater than the radial depth of the threads. The fluid-tight seal of said connection is provided by an interior contact zone 5 similar to the contact zones 5 of FIGS. 1 and 2 and by an intermediate contact zone 16 similar to that of FIG. 2.

FIG. 5 is a partial sectional view through an axial plane of a male element of a threaded connection 1 of the invention, showing one thread 18 of said element. Thread 18 has, in known manner, a dovetail profile with thread crests and roots that are parallel to the axis of the threaded connection and thus straight. Further, the loading flank 19 of the thread 18 joins the thread crest 20 and the adjacent thread root 21 via respective rounded portions the first of which is shown on a larger scale in FIG. 5A. The profile of said rounded portion 22 is composed of two arcs of circles 23 and 24, arc 23 being tangential to the flank 19 and having a radius R1 in the range 0.1 to 0.2 mm, and arc 24 being tangential to arc 23 and to the thread crest 20 and having a radius R2 in the range 0.8 to 1.2 mm. Rounded portion 25 connecting the loading flank 19 to the thread root 21 is similar to rounded portion 22, the circular arc with the smaller radius also being adjacent to the flank 19. These rounded portions reduce the load concentration factor at the base of the loading flanks and thus improve the fatigue behaviour of said connection.

FIG. 6 is a view analogous to FIG. 5, showing a groove 28 provided in the thread crest 20. Said groove has a width l and a depth h, and extends over the whole of the helical path of the male threading to an annular discharge groove 17 (FIGS. 1, 2 and 4) at the end of the threading or the threading portion to encourage evacuation of the grease used for lubrication during makeup and as a result to release the pressure developed by said grease. Groove 28 also slightly increases the flexibility of the threads, rendering the relative axial position of the male and female elements less dependent on machining tolerances. In the example shown, groove 28 is connected to the thread crest via rounded portions. These can be replaced by chamfers.

Figure 9:
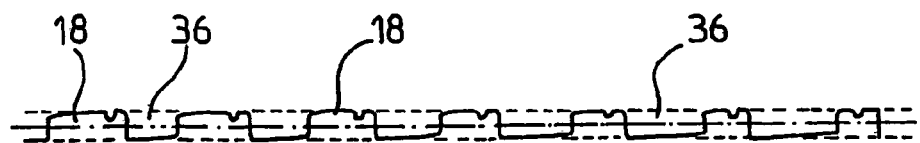
FIG. 9 shows a partial sectional view showing a few turns of the male threading of a connection of the invention, the axial width of the threads and that of the intervals between the threads increasing and decreasing respectively progressively from the free end of the male element.

Rounded portions similar to rounded portions 22 and 25 and/or a groove similar to groove 28 can be provided on the female element in addition to or to replace those of the male element. Further, while the rounded portions and the groove are shown separately in FIGS. 5 and 6, they can advantageously be used together, as shown in FIG. 9. It is also possible to connect the loading flank of the threads of the male element and/or the female element to only the thread crest or the root. A further possible variation consists of providing a single contact zone ensuring a seal to both interior and exterior fluids.

The threadings employed in the embodiments can be of any non interfering type between thread crests and roots, or of the interfering type between thread crests and roots.

FIG. 7 shows a male threading 3 and a female threading 4 in the made up position in the case of non interfering threadings.

The male loading flanks 19 and female loading flanks 30 are in contact, as are the male stabbing flanks 31 and female stabbing flanks 32.

In contrast, there is a clearance 35 between the male and thread crest 20 and the female thread root 33 as well as between the female thread crest 34 and the male thread root 21.

Said function is obtained by causing the loading flanks and stabbing flanks to come into contact before any contact between the thread roots and crests.

It can be seen that by dint of said clearances, a substantial helical leakage channel 35 exists for fluids, even in the absence of a groove 28, the seal being formed by contact surfaces 5, 6, 16.

Figure 8:
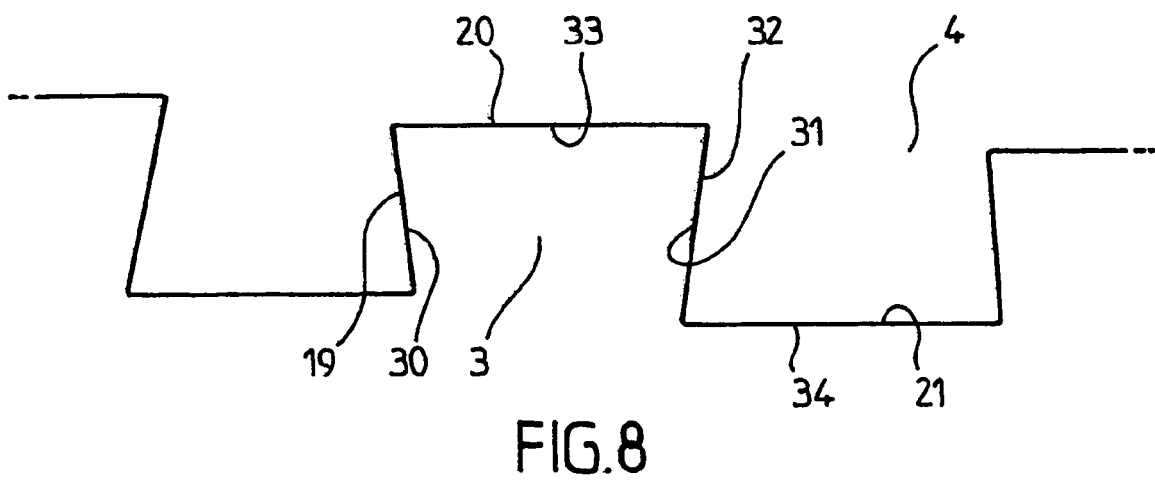

FIG. 8 shows a male threading 3 and a female threading 4 in the made up position in the case of interfering threadings; the reference numbers used in FIG. 7 are used to designate similar elements.

The threadings are designed so that the female thread crests come into contact with the male thread roots and/or the male crests with the female thread roots during makeup before contact of the loading flanks and the stabbing flanks.

Figure 11A:
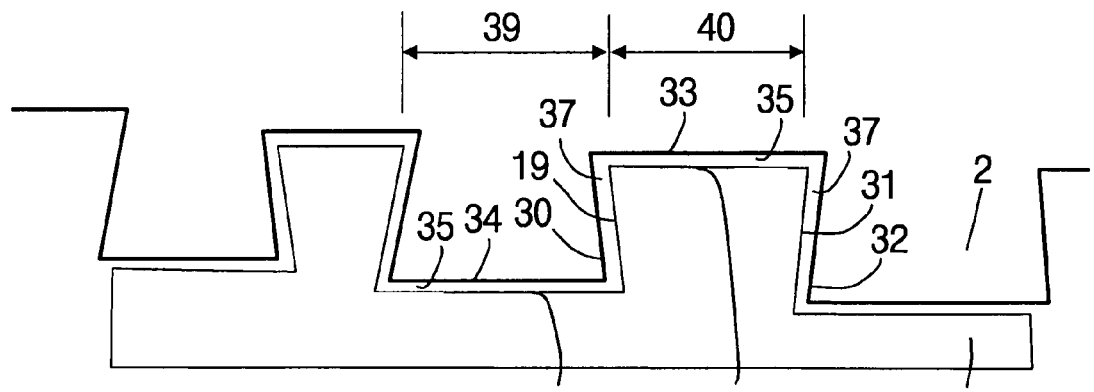
FIG. 11a is a partial axial cross section view of a first section of a male threading interfacing with a female crest and a female root at an early stage of makeup.
Figure 11B:
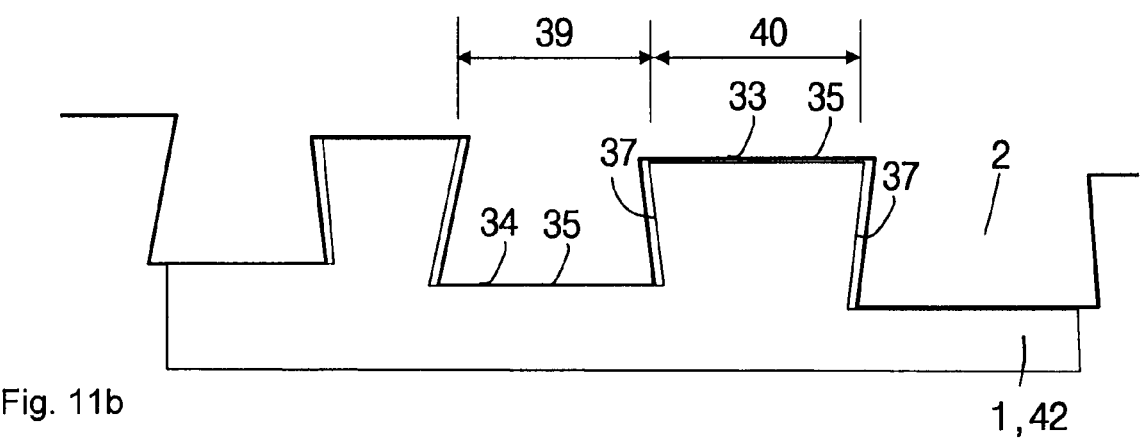
FIG. 11b is a partial axial cross section view of a second section of the male threading interfacing with the female crest and the female root at an intermediate stage of makeup.
Figure 11C:
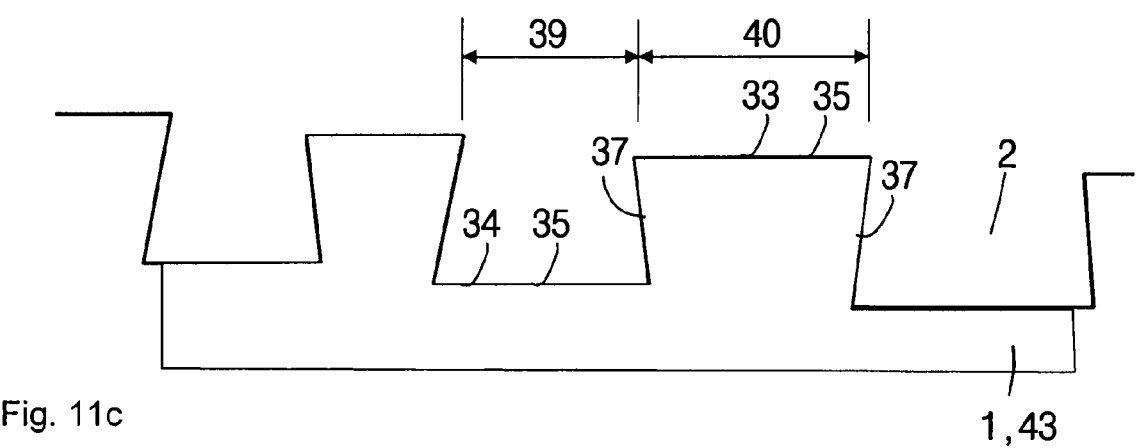
FIG. 11c is a partial axial cross section view of a third section of the male threading interfacing with the female crest and the female root at an end of makeup.

FIGS. 11a, 11b, and 11c illustrate a female thread crest 34 and a female thread root 33 as they interface with a male tubular element 1 through different stages of makeup for one embodiment of the instant invention. FIG. 11a shows the female element 2 early in the makeup process where there is a radial clearance 35 between the female thread root 33 and the male thread crest 20, as well as a radial clearance 35 between the female thread crest 34 and the male thread root 21. The male thread crest 20 and male thread root 21 are represented in FIG. 11a as being part of a first section 41 of the male threading 3 as found on male tubular element 1. The axial clearances 37 are a first axial clearance distance between the female stabbing flank 32 and the male stabbing flank 31 as well as a second axial clearance distance between the female loading flank 30 and the male loading flank 19.

FIG. 11b shows the same female thread root 33 and female thread crest 34 as in FIG. 11a, but the male tubular element 1 has rotated relative to female element 2 and the female thread root 33 and crest 34 are exposed to a second section 42 of the male threading 3 and are nearer to the achieving end of makeup as compared to FIG. 11a. In the more advanced stage of makeup in FIG. 11b, the axial clearances 37 still have not been decreased to zero, but the radial clearances 35 have decreased to zero. At the end of makeup represented in FIG. 11c the axial clearances have decreased to zero where the female thread root 33 and crest 34 are exposed to a third section 43 of the male threading 3.

FIGS. 11a, 11b, and 11c also illustrate an axial width of the male thread 40 and the interval between the male thread 39 varying progressively along an axis of connection over at least a portion of an axial length of the threadings. In FIG. 11a, the axial width of a male thread 40 increases successively from FIG. 11a to FIG. 11b to when the axial width 40 fills up the corresponding female crest 33 in FIG. 11c resulting in zero axial clearances 37. An interval 39 between male threads decreases a corresponding amount with every increase in the axial width 40 of a male thread 38 as shown in FIGS. 11a, 11b, and 11c.

After said contact between the thread crests and roots, makeup can be continued until the loading and stabbing flanks come into contact; the thread crests will interfere with the corresponding thread roots.

However, calculations carried out by the inventors show that a sufficient seal cannot be guaranteed (gas-tight seal) by threads of that type of threading because of deformations in the thread faces and the angles between the faces at the end of makeup.

The presence of a groove will also increase the cross section of the leakage channels resulting from said deformations. As was the case with non interfering threadings, the seal with interfering threadings is made by the contact surfaces 5, 6, 16.

One advantage of interfering threadings is to use, for a constant pipe thickness, higher critical cross sections and as a result, to entrain higher efficiency of the threaded connection under tension.

FIG. 10 is similar to FIGS. 7 and 8 and again bears the same references in the case of interfering threadings at the male thread roots 21 and at the female thread crests 34, a radial clearance 35 existing between the female thread roots 33 and the male thread crests 20. Of course one can provide for the reverse disposition, i.e. a clearance between the male thread roots 21 and the female thread crests 34 and an interference between the female thread roots 33 and the male thread crests 20.

It is also possible to have 2 or more of the dispositions of FIGS. 7, 8 and 10 and of reversed FIG. 10 on the various portions of the threading length for example as in the embodiments of FIGS. 2 and 3 where the threadings are in two portions.

This explains why in FIG. 2 the tapered surfaces of the two threading portions only need to be substantially coincident, the interference difference between the portions inducing a slight radial distance between these surfaces.

By way of example, the dispositions of FIGS. 7 and 8 can be produced with male threads and female threads of a uniform height to 1.16±0.025 mm, and the disposition of FIG. 10 by increasing the female thread height of 1.285±0.025 mm, the male thread height remaining unchanged, which leads to a radial clearance ≧0.075 mm between male crests and female roots.

FIG. 9 shows a few turns of the thread 18 of the male threading of a connection of the invention, separated from each other by a helical interval 36. It illustrates the progressive variation, known per se, of the axial width of the thread 18 and that of the interval 36, respectively increasing and reducing from the free end of the male element, which causes progressive axial interference of the male and female threads during makeup.

The embodiments of FIGS. 1 to 3 are relative to threaded assemblies between two great length pipes constituted by only one threaded connection the male and female tubular elements of which are located at the end of the great length pipes.

Such threaded assemblies can be of the "flush" type (the external diameter of both elements of the threaded connection is that of the pipe) or of the "semi-flush" type also known as "slim-line" (the external diameter of the female element is greater by a few percent than the diameter of the male element).

The invention can also apply to threaded and coupled assemblies between two great length pipes, those coupled assemblies being constituted by two tubular threaded connections, the female elements being positioned opposite on a coupling whereas the male elements are produced on great length pipes.

The invention claimed is:

1. A threaded tubular connection, comprising:
a male tubular element having a male threading, the male threading including a male helical screw thread including a male crest, a male root, a male free end that is a flat surface perpendicular to an axis of the threaded connection, a male stabbing flank, and a male loading flank;
a female tubular element comprising a female threading that cooperates by makeup with the male threading, an axial width of the threads of the male threading and the threads of the female threading and intervals between the threads varying progressively along an axis of connection over at least a portion of an axial length of the male threading and the female threading, the male threading and the female threading being configured such that the threads of each of the male threading and the female threading are housed with an axial clearance in the intervals of the other threading at a staff of makeup, the axial clearance progressively decreasing until the axial clearance becomes zero at an end of makeup, the female threading being a female helical screw thread including a female crest, a female root, a female free end that is a flat surface perpendicular to the axis of the threaded connection, a female stabbing flank, and a female loading flank; and
at least one contact zone axially separated from the male threading and the female threading wherein the male and female elements are in sealed contact by bearing surfaces constituted by a cambered surface and by a tapered surface, the at least one contact zone including a first contact zone, the first contact zone including the cambered surface having a curved contact surface in contact with the tapered surface, the curved contact surface being curved along an axial direction,
wherein the male free end does not abut the female tubular element and the female free end does not abut the male tubular element.

2. The threaded tubular connection according to claim 1, wherein the curved contact surface has a generatrix with a radius of curvature in a range of 30 to 80 millimeters.

3. The threaded tubular connection according to claim 2, wherein a trigonometric tangent to a vertex half angle of the tapered surface is in a range of 0.025 to 0.075.

4. The threaded tubular connection according to claim 1, wherein the first contact zone is axially disposed between the male threading and the female threading and the free end of the male element.

5. The threaded tubular connection according to claim 4, wherein the first contact zone is axially spaced from the free end by at least three millimeters.

6. The threaded tubular connection according to claim 4, wherein the cambered surface and the tapered surface are provided on the male tubular element having the male free end and on the female tubular element respectively.

7. The threaded tubular connection according to claim 6, wherein the cambered surface extends in a direction of the male free end with a second tapered surface that is tangential to the cambered surface.

8. The threaded tubular connection according to claim 1, wherein the first contact zone is axially disposed between the male threading and the female threading and the free end of the female element.

9. The threaded tubular connection according to claim 1, wherein the male helical screw thread includes a first portion and a second portion and the female helical screw thread includes a first portion and a second portion respectively configured to interface with the first portion and the second portion of the male helical screw thread, and
wherein the first contact zone is axially located between the first portion and the second portion of the male helical screw thread.

10. The threaded tubular connection according to claim 9, wherein the cambered surface and the tapered surface belong to the first portion and the second portion of the male helical screw thread and the first portion and second portion of the female helical screw thread element respectively.

11. The threaded tubular connection according to claim 9, wherein the axial width of the threads of the male threading and the threads of the female threading and the intervals between the threads of the male threading and the threads of the female threading vary progressively over the whole of the axial length of each of the first portion and the second portion of the male helical screw thread.

12. The threaded tubular connection according to claim 9, wherein the first portion and the second portion of the male helical screw thread are tapered.

13. The threaded tubular connection according to claim 12, wherein the tapered surfaces having lines joining homologous points on different turns as generatrices for the first portion and the second portion of the male helical screw thread are substantially coincident.

14. The threaded tubular connection according to claim 12, wherein the tapered surfaces having lines joining homologous points on different turns as generatrices for the first portion and the second portion of the male helical screw thread respectively are distinct.

15. The threaded tubular connection according to claim 14, wherein the first portion and the second portion of the male helical screw thread are radially distant by at least one thread depth.

16. The threaded tubular connection according to claim 1, wherein the axial width of the threads of the male threading and the threads of the female threading and the intervals between the threads of the male threading and the threads of the female threading vary progressively over a whole of the axial length of the male threading and the female threading.

17. The threaded tubular connection according to claim 1, wherein the male threading and the female threading have a dove-tail profile.

18. The threaded tubular connection according to claim 17, wherein the male crest, the male root, the female crest, and the female root are parallel to the axis of the threaded connection.

19. The threaded tubular connection according to claim 18, wherein the male element is on a length pipe having a minimum radial thickness between a portion of the threading of the male element furthest from the free end of the male element and the first contact zone is at least 60% of a radial thickness within the length of the pipe.

20. The threaded tubular connection according to claim 18, wherein for the male threading and the female threading, a loading flank joins the thread crest at a rounded portion at an intersection of the thread crest and loading flank, the rounded portion being substantially formed by a first arc of a circle and a second arc of a circle tangent to each other, the first arc being also tangent to the loading flank, and the second arc being tangent to the thread crest, the first arc having a smaller radius of curvature than the second arc.

21. The threaded tubular connection according to claim 20, wherein the radius of the arc adjacent to the loading flank is in a range of 0.1 to 0.2 millimeters.

22. The threaded tubular connection according to claim 21, wherein the radius of the other arc is in a range of 0.8 to 1.2 millimeters.

23. The threaded tubular connection according to claim 18, wherein the male threading and the female threading are non interfering at the thread roots and crests over all or a portion of the male threading and the female threading.

24. The threaded tubular connection according to claim 18, wherein the male threading and the female threading interfere at the thread roots and crests over all or a portion of the male threading and the female threading.

25. The threaded tubular connection according to claim 18, wherein the male threading and the female threading interfere at the thread roots of a first threading and at the thread crests of a second threading over all or a portion of the threading length, whereas there is a radial clearance between the thread roots of the second threading and the thread crests of the first threading.

26. The threaded tubular connection according to claim 25, wherein said radial clearance is at least 0.05 millimeters.

27. The threaded tubular connection according to claim 1, wherein the threaded connection also comprises a second contact zone including a second cambered surface in sealed contact with a second tapered surface, the second cambered surface at the second contact zone having a second curved contact surface in contact with the second tapered surface, the second cambered surface attached to the female element, the second tapered surface attached to the male element, and the second curved contact surface being curved along an axial direction.

28. The threaded tubular connection according to claim 27, wherein the second cambered surface and the second tapered surface have a substantially parabolic distribution of contact pressures along said second contact zone.

29. The threaded tubular connection according to claim 1, wherein a groove formed at the crest of the male threads or the female threads extends along a helical path thereof to allow evacuation of a lubricant and terminates in an annular discharge space present between the male element and the female element at the end of the threading or the threading portion concerned.

30. The threaded tubular connection according to claim 29, wherein the groove has a width of about 0.4 millimeters.

31. The threaded tubular connection according to claim 30, wherein the groove has a depth of about 0.4 millimeters.

32. The threaded tubular connection according to claim 1, wherein the cambered surface and the tapered surface have a substantially parabolic distribution of contact pressures along said first contact zone.

33. The threaded tubular connection according to claim 1, wherein said cambered surface is separated from the male threading and the female threading by an annular groove.

34. A threaded tubular connection, comprising:
a male tubular element comprising a male free end that is a flat surface perpendicular to an axis of the threaded connection and a male threading and a female tubular element comprising a female free end that is a flat surface perpendicular to the axis of the threaded connection and a female threading that cooperates by makeup with the male threading, an axial width of threads of the male threading and the female threading and intervals between the male thread and the female thread varying progressively along an axis of connection over at least a portion of an axial length of the male threading and the female threading, such that the threads of each of the male threading and the female threading are housed with an axial clearance in the intervals of the other threading at a start of makeup, the clearance progressively decreasing until it becomes zero at an end of makeup; and
at least one contact zone axially separated from the male threading and the female threading in which the male element and the female element are in sealed contact by bearing surfaces respectively constituted by a cambered surface and by a tapered surface, the at least one contact zone including a first contact zone, the first contact zone including the cambered surface having a curved contact surface in contact with the tapered surface, the curved contact surface being curved along an axial direction,
wherein the male free end does not abut the female tubular element and the female free end does not abut the male tubular element and said contact zone is pivotable along said curved contact surface in response to axial positional variations of said male tubular element and said female tubular element.

35. A threaded tubular connection, comprising:
a male tubular element having a male threading, the male threading including a male crest, a male root, a male loading flank, and a male stabbing flank;
a female tubular element having a female threading which cooperates by makeup with said male threading, an axial width of the threads of said male threading and said female threading and the intervals between said threads of said male threading and said female threading varying progressively along the axis of the connection over at least a portion of the axial length of the male threading and the female threading, such that the threads of each of the male threading and the female threading are housed with an axial clearance in the intervals of the other threading at a start of makeup, said clearance progressively decreasing until it becomes zero at an end of makeup in a final position of the male and the female threading, the female threading including a female crest, a female root, a female loading flank, and a female stabbing flank; and
at least one contact zone axially separated from said threadings in which the male element and the female element are in sealed contact by means of bearing surfaces respectively constituted by a cambered surface and by a tapered surface, the at least one contact zone including a first contact zone, the first contact zone including the cambered surface having a curved contact surface in contact with the tapered surface, the curved contact surface of being curved along an axial direction,
wherein a trigonometric tangent to a vertex half angle of the tapered surface is in the range of 0.025 to 0.075, and the contact is a sealed metal-to-metal contact being effective in said final position of the male and the female threading.

* * * * *